Patented Sept. 12, 1950

2,522,177

UNITED STATES PATENT OFFICE 2,522,177

ETHERS OF 16-KETO-(α) ESTRADIOL AND METHOD OF MANUFACTURING THE SAME

Max N. Huffman, Dallas, Tex., assignor to G. D. Searle & Co., Chicago, Ill., a corporation of Illinois No Drawing. Application January 7, 1948, Serial No. 1,058

8 Claims. (Cl. 260—397.4)

This invention relates to the estrogens and particularly to the manufacture artificially of estrogenic compounds, none of which have been isolated in nature.

The natural occurring estrogenic hormones are derivatives of the hydrocarbon estrane

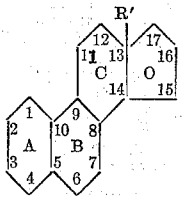

having a phenolic hydroxyl group at C3 and an oxygen function at C17. Ring A or rings A and B are ordinarily benzenoid. Thus, for instance, estrone and (α)estradiol are natural estrogen hormones which have been isolated from animal and plant life. At the present, (α)estradiol is one of the most potent estrogens known; its corresponding (β) derivative has very little physiological activity, which indicates the importance of the steric positions of these oxygen functional groups.

The natural estrogens have been widely used to supplement or replace the natural glandular secretions of hormones necessary in normal body functions. In order better to achieve their goal, many investigators have suggested and have synthesized derivatives of estrogens which are unlike the natural substances but which they believed capable of entering the body metabolism in a beneficial manner.

I have found, for example, that certain important benefits are derived, both chemically and biologically, when a functional carbonyl group is provided on the C16 position of the various estrogens, and especially (α)estradiol. Little is known of these derivative materials at the present time.

In an article entitled "The Relative Estrogenic Activity of Compounds Related to Estriol," published in "Endrocrinology" by the applicant in conjunction with Grollman (vol. 41, No. 1, July 1947), it is suggested that the possible pathway of the conversion of 16-keto-estrone to estriol in normal body metabolism is through intermediates in the form of 16-keto-(α)estradiol. From this, it may be assumed that such intermediates may be more beneficially received and utilized for normal body metabolism in a manner not to interfere with the other body functions.

I have found, further, that etherification of the phenolic hydroxyl at C3 is very advantageous from the standpoint of further synthetic operations upon the molecule. Although many investigators have modified the 3-hydroxy group of the steroids for various purposes, the 3-ether-16-keto-(α)estradiols are wholly unknown.

It, therefore, is an object of this invention to produce (α)estradiols having a functional carbonyl group in the C16 position.

Another object is to produce the 3-ethers of (α)estradiol having a keto group in the C16 position.

A further object is to provide methods for producing the above derivatives by partial synthesis from natural or artificial estrogens, which in themselves may be partially synthesized.

More particularly, it is an object of this invention to produce and to provide methods for producing 3-methyl and 3-benzyl ethers of 16-keto-(α)estradiol, the methods having the characteristics of simplicity, good yield, and purity of product.

By the term "3-ethers of 16-keto-(α)estradiol," as used herein, it is meant compounds represented by the formula:

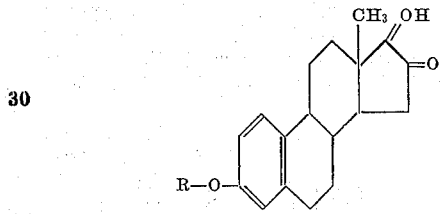

where R is hydrogen, such as in 16-keto-(α)-estradiol, or where R is an organic radical of the type, aliphatic, alicyclic, aromatic, mixed aliphatic-aromatic, or heterocyclic and derivatives thereof. When aliphatic or aliphatic-aromatic, the aliphatic group may be branched or straight-chained, saturated or unsaturated, and modified or unmodified. For example, R may be methyl, ethyl, propyl, isoamyl, allyl, cyclopentyl, benzyl, tolyl, naphthyl, and the like. In so far as the steroid nucleus is concerned, rings A, B, C, and D may be saturated or unsaturated. More often, ring A is benzenoid or rings A and B both may be benzenoid.

I have produced these 3-ether-16-keto-(α)-estradiol compounds by various methods employing as the parent compound the corresponding 16-oximino-17-keto-steroid, the corresponding 16, 17-diketo-steroid, or 16-keto-(α)estradiol.

In one method illustrated by the following example, the corresponding 3-ether-16-oximino-17-keto-steroid is reduced by reaction in the presence of zinc and acetic acid or other like organic acids, such as propionic, formic, and the like.

EXAMPLE I

*3-benzyl ether of 16-keto-(α)estradiol from 3-benzyl ether-16-oximino-estrone*

To 400 mg. of 16-oximino-estrone-3-benzyl ether in about 13 cc. of water, 1.5 grams of zinc dust and 26 cc. of acetic acid are added. After refluxing for about 80 minutes, the supernatant fluid is decanted from the zinc, the latter of which is washed with successive increments of acetic acid or other acids or solvents capable of solution of the steroid derivatives to insure full recovery of the steroid derivatives. The acetic acid solution is diluted with about 25 cc. of water, from which solution, crystals of the 3-benzyl ether-16-keto-(α)estradiol slowly separate. Purification of the product may be effected by recrystallization from acetic acid.

Another synthesis, illustrated in Example II, employs the reactions effecting the reduction of the corresponding 16, 17-diketo-steroid by reacting in the presence of zinc and acetic acid or other like organic acids.

EXAMPLE II

*3-methyl ether-16-keto-(α)estradiol from 3-methyl ether-16-keto-estrone*

100 mg. of the 3-methyl ether 16-keto-estrone, about 10 cc. of 50 percent acetic acid, and 0.2 gram of zinc dust are heated together with stirring at about 90° C. During the course of the reaction, which may take about 40 minutes, small granules of zinc dust are occasionally added. When cooled, the fluids are rinsed from the zinc with ethyl ether or other suitable solvents and the ethereal solution treated successively with water, 3 percent sodium bisulfite or other alkali sulfites or bisulfites, 5 per cent sodium carbonate, and additional portions of water. Upon evaporization of the solvent, crystals of 3-methyl ether-16-keto-(α)estradiol are obtained. For purposes of purification, the crystals may be subsequently treated with charcoal and recrystallized from aqueous alcohol, such as methyl alcohol or ethyl alcohol.

A third method which I have employed for the manufacture of the 3-ethers of 16-keto-(α)estradiol comprises reducing the corresponding 16, 17-diketo-steroid by reaction in the presence of titanium chloride and acetic acid or other like organic acids. This process is illustrated in the following example:

EXAMPLE III

*3-ethyl ether-16-keto-(α)estradiol from 3-ethyl ether-16-keto-estrone*

5 cc. of titanous chloride (20 percent) and 5 cc. of acetic acid are mixed on a steam bath for about 30 minutes with about 100 mg. of 3-ethyl ether-16-keto-estrone. The resulting purple solution is distributed between ether and water phases after cooling to room temperature. The orchid colored aqueous phase is separated and the ether phase is washed successively with water and dilute sodium carbonate. Upon evaporation of the ether, rosettes of glassy crystals of 3-ethyl ether-16-keto-(α)estradiol are obtained. These crystals may be purified by treatment with charcoal and aqueous methyl alcohol and recrystallized from aqueous acetone, cyclohexane, and aqueous ethanol in successive steps.

Still another method for preparing the 3-benzyl ether of 16-keto-(α)estradiol comprises the benzylation of 16-keto-(α)estradiol, as by reacting the 16-keto-(α)estradiol in the presence of benzyl halides and alkali.

EXAMPLE IV

*3-benzyl ether-16-keto-(α)estradiol from 16-keto-(α)estradiol*

A solution of 400 mg. of 16-keto-(α)estradiol, 0.8 cc. of benzyl chloride, and 20 cc. of alcohol, such as ethanol, is refluxed over 0.9 gram of anhydrous potassium carbonate. Potassium chloride soon commences to precipitate from the solution, and after about an hour and a half refluxing, a small increment of water, such as 5 cc., is added. Crystals of 3-benzyl ether-16-keto-(α)estradiol are secured after the reaction mixture is cooled and allowed to stand for a long period of time. Purification of the product may be effected by recrystallization from aqueous acetic acid, such as in a combination of 50 cc. of acetic acid with 15 cc. of water.

It will be understood that these examples of specific syntheses are given by way of illustration and not by way of limitation, and that numerous changes and substitutions may be made in the reactive ingredients and their relative proportions without departing from the scope of the invention. It will be further understood that the 3-ether-16-keto-(α)estradiol compounds specifically named and described do not comprise all of the invention since various homologs, functional groups, and addition elements may be incorporated on or in the steroid nucleus.

It will be apparent from the description that a cardinal feature of this invention is the production of many new estrogens for use as chemical intermediates.

I claim:

1. The 3-lower alkyl ethers of 16-keto-(α)-estradiol.
2. The 3-methyl ether of 16-keto-(α)estradiol.
3. The 3-ethyl ether of 16-keto-(α)estradiol.
4. The 3-benzyl ether of 16-keto-(α)estradiol.
5. The 3-ethers of 16-keto-(α)estradiol in which the ether group is selected of the radicals consisting of benzyl and low aliphatic radicals.
6. The method of manufacturing the 3-ethers of 16-keto-estradiol, comprising reducing the corresponding 3-ethers of 16-oximino estrone in the presence of zinc and an organic carboxylic acid.
7. The method of manufacturing the 3-ethers of 16-keto-(α)estradiol, comprising reducing the corresponding 3-ethers of 16-oximino estrone in the presence of zinc and a low aliphatic acid.
8. The method of manufacturing the 3-ethers of 16-keto-(α)estradiol, comprising the reducing of the corresponding 3-ethers of 16-oximino estrone by reaction of the latter in the presence of zinc and an organic acid, dissolving the 3-ethers of 16-keto-(α)estradiol from the reaction product in additional organic acid, and then diluting the solution with water to separate the 3-ether of 16-keto-(α)estradiol as a solvent.

MAX N. HUFFMAN.

REFERENCES CITED

The following references are of record in the file of this patent:

Huffman: Jour. Am. Chem. Soc., vol. 64 (1942), pages 2235–2236.